United States Patent
Tang

(10) Patent No.: US 9,401,793 B2
(45) Date of Patent: Jul. 26, 2016

(54) METHOD AND APPARATUS FOR ENCODING UPLINK CONTROL INFORMATION

(71) Applicant: Huawei Technologies Co., Ltd., Shenzhen, Guangdong (CN)

(72) Inventor: Zhenfei Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 14/302,988

(22) Filed: Jun. 12, 2014

(65) Prior Publication Data

US 2014/0293921 A1 Oct. 2, 2014

Related U.S. Application Data

(63) Continuation of application No. PCT/CN2012/087371, filed on Dec. 25, 2012.

(30) Foreign Application Priority Data

Dec. 29, 2011 (CN) .......................... 2011 1 0452336

(51) Int. Cl.
*H04W 4/00* (2009.01)
*H04L 5/00* (2006.01)
(Continued)

(52) U.S. Cl.
CPC .............. *H04L 5/0055* (2013.01); *H04L 1/001* (2013.01); *H04L 1/003* (2013.01); *H04L 1/0026* (2013.01);
(Continued)

(58) Field of Classification Search
None
See application file for complete search history.

(56) References Cited

U.S. PATENT DOCUMENTS

2011/0269490 A1* 11/2011 Earnshaw ............. H04L 1/0026 455/509
2012/0230268 A1* 9/2012 Marinier ............... H04L 5/0053 370/329

FOREIGN PATENT DOCUMENTS

CN 101902313 A 12/2010
CN 101917253 A 12/2010
(Continued)

OTHER PUBLICATIONS

"3$^{rd}$ Generation Partnership Project; Technical Specification Group Radio Access Network; Evolved Universal Terrestrial Radio Access (E-UTRA); Multiplexing and channel coding (Release 10)," 3GPP TS 36.212, V10.3.0, pp. 1-79, 3$^{rd}$ Generation Partnership Project, Valbonne, France (Sep. 2011).

(Continued)

*Primary Examiner* — Yemane Mesfin
*Assistant Examiner* — Jeff Banthrongsack
(74) *Attorney, Agent, or Firm* — Leydig, Voit & Mayer, Ltd.

(57) ABSTRACT

A method for encoding uplink control information comprises: determining the number of bits of the first uplink control information and the number of bits of second uplink control information; determining a second parameter for channel encoding of the first uplink control information according to the number of bits of the first uplink control information and the number of bits of the second uplink control information; determining the number of encoding symbols or the number of encoding bits of the first uplink control information according to the second parameter and the number of bits of the first uplink control information; encoding the first uplink control information according to the number of encoding symbols or the number of encoding bits of the first uplink control information.

6 Claims, 9 Drawing Sheets

(51) Int. Cl.
*H04W 72/04* (2009.01)
*H04L 1/00* (2006.01)
*H04L 1/16* (2006.01)
*H04L 1/18* (2006.01)

(52) U.S. Cl.
CPC ............ *H04L 1/0031* (2013.01); *H04L 1/0073* (2013.01); *H04L 1/1671* (2013.01); *H04L 1/1812* (2013.01); *H04W 72/0413* (2013.01); *H04L 1/0067* (2013.01); *H04L 1/0071* (2013.01)

(56) References Cited

FOREIGN PATENT DOCUMENTS

| | | |
|---|---|---|
| CN | 101984568 A | 3/2011 |
| CN | 102223720 A | 10/2011 |
| CN | 102394725 A | 3/2012 |

OTHER PUBLICATIONS

"3$^{rd}$ Generation Partnership Project; Technical Specification Group Radio Access Network; Evolved Universal Terrestrial Radio Access (E-URTA); Physical layer procedures (Release 10)," 3GPP TS 36.213, V10.3.0, pp. 1-122, 3$^{rd}$ Generation Partnership Project, Valbonne, France (Sep. 2011).

"3$^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.3.0, pp. 1-103, 3$^{rd}$ Generation Partnership Project, Valbonne, France (Sep. 2011).

"Consideration on HARQ-ACK and CSI Multiplexing on PUCCH Format 3," 3GPP TSG RAN WG1 Meeting #66bis, Zhuhai, China, R1-113399, 3$^{rd}$ Generation Partnership Project, Valbonne, France (Oct. 10-14, 2011).

"Simultaneous Transmission of HARQ-ACK and CSI on PUCCH Format 3," 3GPP TSG RAN WG1 Meeting #67, San Francisco, USA, R1-113904, 3$^{rd}$ Generation Partnership Project, Valbonne, France (Nov. 14-18, 2011).

\* cited by examiner

METHOD AND APPARATUS FOR ENCODING UPLINK CONTROL INFORMATION

CROSS-REFERENCE TO RELATED APPLICATIONS

This application is a continuation of International Patent Application No. PCT/CN2012087371, filed Dec. 25, 2012, which claims priority to Chinese Patent Application No. 201110452336.8, filed Dec. 29, 2011, both of which are hereby incorporated by reference in their entireties.

TECHNICAL FIELD

The embodiments of the present disclosure relate to communications filed, and more particularly to a method and an apparatus for encoding uplink control information as well as a method and an apparatus for transmitting uplink control information on a physical uplink control channel.

BACKGROUND

In LTE (Long-Term Evolution) Release-8Release-9Release-10, a plurality of PUCCHs (Physical Uplink Control Channel) is defined, such as a PUCCH Format 3 channel. Among them, the PUCCH Format 3 channel is used for transmitting hybrid automatic repeat request acknowledgement (HARQ-ACK) information, and thus can support the transmission of 1 to 20 information bits. However, when schedule request (SR) information and HARQ-ACK information are transmitted in one subframe at the same time, the PUCCH Format 3 channel can at most support the transmission of 21 information bits.

Here, the PUCCH Format 3 channel is taken as an example. User equipment (UE) firstly performs RM (Reed-Muller) channel encoding on bits of the HARQ-ACK information and those of possible SR information (that is, the bits of hybrid automatic repeat request acknowledgement and schedule request information (HARQ-ACKSR information), including the HARQ-ACK information or the HARQ-ACK information and the SR information), and then performs scrambling, Quadrature Phase Shift Keying (QPSK) modulation, block-wise spread using an orthogonal sequence, cyclically shifting, transform precoder (also called as DFT precoder), and mapping of Physical Resource Block (PRB). A baseband sending signal obtained through Single Carrier Frequency Division Multiplexing Access (SC-FDMA) baseband signal generation (also called as IFFT transformation) is emitted via medium radio frequency. An evolved Node B (eNB) receives an emitted signal and performs demodulation according to the above process, thereby obtaining bits of the HARQ-ACKSR information through decoding.

The UE measures a downlink channel, and obtains Channel State Information (CSI) of the downlink channel, wherein the CSI includes information such as Channel Quality Indicator (CQI), Precoding Matrix Indicator (PMI), and Rank Indication (RI). The UE feeds the CSI back to the eNB which employs the CSI to perform downlink data scheduling. Specifically, the fed CSI can be divided into periodic CSI and non-periodic CSI, or can be divided into the CSI fed on the PUCCH and the CSI fed on the PUSCH (Physical Uplink Shared Channel).

In some configurations, when the periodic CSI and the HARQ-ACK/SR information are transmitted in one subframe at the same time, the periodic CSI will be discarded because the greater the number of downlink carriers, the larger the number of the periodic CSI to be configured, and the greater the number of subframes occupied by the periodic CSI, the higher the possibility that the periodic CSI and the HARQ-ACKSR information are transmitted in one subframe, and the more frequent the periodic CSI is discarded under the circumstance where the number of the subframe occupied by the HARQ-ACKSR information is constant. Therefore, such situations shall be taken into consideration in case of eNB scheduling, the scheduling complexity is increased and a downlink throughput capacity is lost.

To this end, there has been proposed a scheme which supports the simultaneous transmission of the periodic CSI and the HARQ-ACK/SR information on the PUCCH Format 3 so as to reduce the situation where the periodic CSI is discarded and enhances downlink transmission performance. There are mainly two schemes: joint encoding and independent encoding. As shown in FIG. 1, the so-called "joint encoding scheme" means to cascade-multiplex the periodic CSI and the HARQ-ACKSR information before channel encoding, and then perform joint encoding uniformly, finally make the periodic CSI and the HARQ-ACK/SR information subjected to the above processing of the PUCCH Format 3 channel. As shown in FIG. 2, the so-called "independent encoding scheme" means to independently perform channel encoding and rate matching on the period CSI and the HARQ-ACKSR information, and then interweave the periodic CSI and the HARQ-ACK/SR information after channel encoding by an interweaver, finally make the periodic CSI and the HARQ-ACKSR information subjected to the above processing of the PUCCH Format 3 channel. Since the PUCCH Format 3 channel can only transmit 48 encoded bits (that is, 24 symbols after QPSK encoding modulation), how to respectively perform channel encoding on the periodic CSI and the HARQ-ACK/SR information is a problem to be solved.

SUMMARY

The embodiment of the present disclosure provides a method and an apparatus for encoding uplink control information as well as a method and an apparatus for transmitting uplink control information on a physical uplink control channel, which can solve the problem of performing channel encoding on first uplink control information or second uplink control information.

In one aspect, there is provided a method for encoding uplink control information, including: determining the number of bits of first uplink control information or determining the number of bits of the first uplink control information and the number of bits of second uplink control information; determining a first parameter for channel encoding of the first uplink control information according to the number of bits of the first uplink control information, or determining a second parameter for channel encoding of the first uplink control information according to the number of bits of the first uplink control information and the number of bits of the second uplink control information; determining the number of encoding symbols or the number of encoding bits of the first uplink control information according to the first parameter and the number of bits of the first uplink control information, or determining the number of encoding symbols or the number of encoding bits of the first uplink control information according to the second parameter and the number of bits of the first uplink control information; encoding the first uplink control information according to the number of encoding symbols or the number of encoding bits of the first uplink control information.

In another aspect, there is provided a method for encoding uplink control information, including: determining the number of bits of first uplink control information and the number of bits of second uplink control information; determining a first parameter for channel encoding of the second uplink control information according to the number of bits of the first uplink control information, or determining a second parameter for channel encoding of the second uplink control information according to the number of bits of the first uplink control information and the number of bits of the second uplink control information; determining the number of encoding symbols or the number of encoding bits of the second uplink control information according to the first parameter and the number of bits of the second uplink control information, or determining the number of encoding symbols or the number of encoding bits of the second uplink control information according to the second parameter and the number of bits of the second uplink control information; encoding the second uplink control information according to the number of encoding symbols or the number of encoding bits of the second uplink control information.

In yet another aspect, there is provided a method for transmitting uplink control information on a physical uplink control channel, including: sending an indicator signaling such that user equipment UE determines a offset value of first uplink control information and second uplink control information for channel encoding according to the indicator signaling; receiving the first uplink control information and the second uplink control information sent by the UE on the physical uplink control channel, wherein the first uplink control information and the second uplink control information are obtained according to encoding the number of encoding symbols or the number of encoding bits of the first uplink control information as well as the number of encoding symbols or the number of encoding bits of the second uplink control information, the number of encoding symbols or the number of encoding bits of the first uplink control information as well as the number of encoding symbols or the number of encoding bits of the second uplink control information are determined according to the offset value as well as the first uplink control information and the second uplink control information; performing downlink data scheduling according to the first uplink control information and the second uplink control information.

In another aspect, there is provided an apparatus for encoding uplink control information, including: a first determining unit, for determining the number of bits of first uplink control information or determining the number of bits of the first uplink control information and the number of bits of second uplink control information; a second determining unit, for determining a first parameter for channel encoding of the first uplink control information according to the number of bits of the first uplink control information, or determining a second parameter for channel encoding of the first uplink control information according to the number of bits of the first uplink control information and the number of bits of the second uplink control information; a third determining unit, for determining the number of encoding symbols or the number of encoding bits of the first uplink control information according to the first parameter and the number of bits of the first uplink control information, or determining the number of encoding symbols or the number of encoding bits of the first uplink control information according to the second parameter and the number of bits of the first uplink control information; an encoding unit, for encoding the first uplink control information according to the number of encoding symbols or the number of encoding bits of the first uplink control information determined by the third determining unit.

In another aspect, there is provided an apparatus for encoding uplink control information, including: a first determining unit, for determining the number of bits of first uplink control information and the number of bits of second uplink control information; a second determining unit, for determining a first parameter for channel encoding of the second uplink control information according to the number of bits of the first uplink control information, or determining a second parameter for channel encoding of the second uplink control information according to the number of bits of the first uplink control information and the number of bits of the second uplink control information; a third determining unit, for determining the number of encoding symbols or the number of encoding bits of the second uplink control information according to the first parameter and the number of bits of the second uplink control information, or determining the number of encoding symbols or the number of encoding bits of the second uplink control information according to the second parameter and the number of bits of the second uplink control information; a first encoding unit, for encoding the second uplink control information according to the number of encoding symbols or the number of encoding bits of the second uplink control information.

In yet another aspect, there is provided an apparatus for transmitting uplink control information on a physical uplink control channel, including: a sending unit, for sending an indicator signaling such that user equipment UE determines a offset value of first uplink control information and second uplink control information for channel encoding according to the indicator signaling; a receiving unit, for receiving the first uplink control information and the second uplink control information sent by the UE on the physical uplink control channel, wherein the first uplink control information and the second uplink control information are obtained according to encoding the number of encoding symbols or the number of encoding bits of the first uplink control information as well as the number of encoding symbols or the number of encoding bits of the second uplink control information, the number of encoding symbols or the number of encoding bits of the first uplink control information as well as the number of encoding symbols or the number of encoding bits of the second uplink control information are determined according to the offset value as well as the first uplink control information and the second uplink control information; a scheduling module, for performing downlink data scheduling according to the first uplink control information and the second uplink control information.

The method and the apparatus for encoding uplink control information as well as the method and the apparatus for transmitting uplink control information on a physical uplink control channel of the embodiment of the present disclosure can ensure that the demodulating performances of the first uplink control information (for example, the periodic CSI) and the second uplink control information (for example, the HARQ-ACK/SR information) are at relatively approximate operating points, so as to achieve the best channel encoding performance.

BRIEF DESCRIPTION OF THE DRAWINGS

In order to more clearly describe the technical solutions of the embodiments of the present disclosure, the drawings to be used in the descriptions of the embodiments or the prior art are briefly introduced as follows. Obviously, the following drawings just illustrate some embodiments of the present disclosure, and a person skilled in the art can obtain other drawings from these drawings without paying any creative effort.

DETAILED DESCRIPTION OF THE EMBODIMENTS

Figure 1:
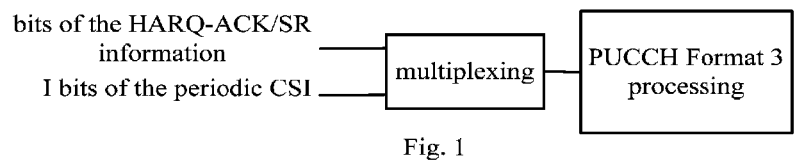
FIG. 1 is a schematic diagram of the joint encoding scheme in the prior art.
Figure 2:
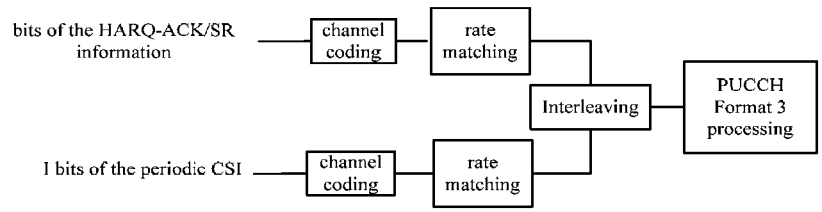
FIG. 2 is a schematic diagram of the independent encoding scheme in the prior art.

The technical solutions in the embodiments of the present disclosure will be clearly and completely described as follows with reference to the drawings in the embodiments of the present disclosure. Obviously, those described herein are just parts of the embodiments of the present disclosure rather than all the embodiments. Based on the embodiments of the present disclosure, any other embodiment obtained by a person skilled in the art without paying any creative effort shall fall within the protection scope of the present disclosure.

The technical solution of the present disclosure is applied to various communications systems, such as LTE (Long Term Evolution), LTE-A (LTE-Advanced), etc.

The user equipment (UE), also called as a Mobile Terminal, mobile user equipment, etc, can communicate with one or more core networks via a wireless access network (such as RAN: Radio Access Network). The user equipment can be a mobile terminal (such as a mobile phone (or called as "cellular" phone)) and a computer with the mobile terminal (such as a portable, pocket, hand-held, computer built-in or vehicle-mounted mobile device), all of which exchange language and/or data with the wireless access network.

A base station can be an evolved base station in LET (eNB or e-NodeB, evolutional Node B).

The method for encoding uplink control information according to the embodiment of the present disclosure will be described in detail in connection with FIG. 3. The specific steps are as follows.

Step 31: The UE determines the number of bits of first uplink control information or determines the number of bits of the first uplink control information and the number of bits of second uplink control information.

Step 32: The UE determines a first parameter for channel encoding of the first uplink control information according to the number of bits of the first uplink control information, or determines a second parameter for channel encoding of the first uplink control information according to the number of bits of the first uplink control information and the number of bits of the second uplink control information.

For example, the first uplink control information is the periodic channel state information (CSI), and the second uplink control information is the hybrid automatic repeat request acknowledgement and schedule request (HARQ-ACKSR) information.

Optionally, a factor related to the parameter for channel encoding of the first uplink control information or the second uplink control information is locally stored in the UE. When receiving a signaling issued by the base station, the UE determines the parameter for channel encoding of the first uplink control information according to the indicator of the signaling as well as the number of bits of the first uplink control information or the number of bits of the second uplink control information. Or, a factor related to the parameter for channel encoding of the first uplink control information or the second uplink control information is locally stored in the UE and corresponds to the number of bits of the first uplink control information or the number of bits of the second uplink control information, thereby determining the parameter for channel encoding of the first uplink control information according to the number of bits of the first uplink control information or the number of bits of the second uplink control information.

Step 33: The UE determines the number of encoding symbols or the number of encoding bits of the first uplink control information according to the first parameter and the number of bits of the first uplink control information, or determines the number of encoding symbols or the number of encoding bits of the first uplink control information according to the second parameter and the number of bits of the first uplink control information.

Step 34: The UE encodes the first uplink control information according to the number of encoding symbols or the number of encoding bits of the first uplink control information, so as to send the encoded first uplink control information to the base station on the physical uplink control channel.

Additionally, since the number of encoding symbols or the number of encoding bits of the first uplink control information is determined in the foregoing steps, it is possible to determine the number of encoding symbols or the number of encoding bits of the second uplink control information according to the number of encoding symbols or the number of encoding bits of the first uplink control information, and then to encode the second uplink control information according to the number of encoding symbols or the number of encoding bits of the second uplink control information, so as to send the encoded second uplink control information to the base station on the physical uplink control channel.

When the first uplink control information is the periodic CSI and the second uplink control information is the HARQ-ACKSR information, the UE determines that the first parameter for channel encoding of the periodic CSI is $\beta^{CSI}_{offset} - \alpha^{CSI} \cdot O_{CSI}$ according to the number of bits $O_{CSI}$ of the periodic CSI, wherein $\beta^{CSI}_{offset}$ the first offset value of the periodic CSI and $\alpha^{CSI}$ is a coefficient of the second offset value of the periodic CSI, $\beta^{CSI}_{offset}$ and $\alpha^{CSI}$ can be configured by the signaling of the base station; or the UE determines that the second parameter for channel encoding of the periodic CSI is $\beta^{CSI}_{offset} - \alpha^{CSI} \cdot O_{CSI} - \alpha^{HARQ-ACK} \cdot O_{HARQ-ACK}$ according to the number of bits $O_{CSI}$ of the periodic CSI and the number of bits $O_{HARQ-ACK}$ of the HARQ-ACK/SR information, wherein $\beta^{CSI}_{offset}$ is the first offset value of the periodic CSI, $\alpha^{CSI}$ is the coefficient of the second offset value of the periodic CSI, and $\alpha^{HARQ-ACK}$ is the coefficient of the third offset value of the HARQ-ACK/SR information, and $\beta^{CSI}_{offset}$, $\alpha^{CSI}$ and $\alpha^{HARQ-ACK}$ can be configured by the signaling of the base station. Optionally, the UE determines that the first parameter for channel encoding of the periodic CSI is $\beta^{CSI}_{offset} \cdot \chi^{CSI}$ according to the number of bits $O_{CSI}$ of the periodic CSI, wherein $\chi^{CSI}$ is an adjusting parameter $\chi^{CSI}$ of the periodic CSI corresponding to the number of bits $O_{CSI}$ of the periodic CSI, and $\beta^{CSI}_{offset}$ can be the first offset value of the periodic CSI which can be configured by the signaling of the base station.

Under the circumstance where the number of encoding symbols or the number of encoding bits of the periodic CSI is determined, it is possible to determine the number of encoding symbols or the number of encoding bits of the HARQ-ACK/SR information.

Specifically, upon the transmission of the periodic CSI and the HARQ-ACK/SR information, the steps of determining the number of encoding bits or the number of encoding symbols of the periodic CSI and the HARQ-ACKSR are as follows. Herein, there does not exist any dependent relationship among part of the steps, and the steps can be performed in a random order.

In the following embodiments, the number of encoding bits or the number of encoding symbols of the periodic CSI is firstly determined, and then the number of encoding bits or the number of encoding symbols of the HARQ-ACK/SR information is determined.

(1) The eNB informs the UE of determining a offset value set for channel encoding of the periodic CSI and the HARQ-ACK/SR information through the signaling. Herein, the above signaling includes, but not limited to, a high layer signaling or a physical layer signaling, for example, the informing manner of the high layer signaling includes, but not limited to, cell-specific high layer signaling or UE-specific high layer signaling.

As stated above, the offset value set at least contains the first offset value $\beta^{CSI}_{offset}$ of the periodic CSI and the coefficient $\alpha^{CSI}$ of the second offset value. According to a table wherein a predefined serial number of the signaling corresponds to the first offset value $\beta^{CSI}_{offset}$ and the coefficient $\alpha^{CSI}$ of the second offset value, as shown in Table 1-1 and Table 1-2, the specific first offset value $\beta^{CSI}_{offset}$ and the coefficient $\alpha^{CSI}$ of the second offset value are determined.

Further, the offset value set also contains a coefficient $\alpha^{HARQ-ACK}$ of the third offset value. According to a table wherein a predefined serial number of the signaling corresponds to the coefficient $\alpha^{HARQ-ACK}$ of the third offset value, as shown in Table 1-3, the specific coefficient $\alpha^{HARQ-ACK}$ of the third offset value is determined.

When the number of encoding symbols of the periodic CSI and the HARQ-ACKSR are determined, as shown in the corresponding Table 1-1, Table 1-2 and Table 1-3, the embodiment of the present disclosure is not limited to the following values.

TABLE 1-1

Table wherein $\beta_{offset}^{CSI}$ corresponds to the signaling serial number

| Signaling serial number of $\beta_{offset}^{CSI}$ | $\beta_{offset}^{CSI}$ value |
|---|---|
| 0 | 2 |
| 1 | 2.25 |

TABLE 1-1-continued

Table wherein $\beta_{offset}^{CSI}$ corresponds to the signaling serial number

| Signaling serial number of $\beta_{offset}^{CSI}$ | $\beta_{offset}^{CSI}$ value |
|---|---|
| 2 | 2.5 |
| 3 | 2.75 |
| 4 | 3 |
| 5 | 3.25 |
| 6 | 3.5 |
| 7 | 3.75 |
| 8 | 4 |
| 9 | 4.25 |
| 10 | 4.5 |
| 11 | 4.75 |
| 12 | 5 |
| 13 | reserved |
| 14 | reserved |
| 15 | reserved |

TABLE 1-2

Table wherein $\alpha^{CSI}$ corresponds to the signaling serial number

| Signaling serial number of $\alpha^{CSI}$ | $\alpha^{CSI}$ value |
|---|---|
| 0 | 0.1 |
| 1 | 0.12 |
| 2 | 0.14 |
| 3 | 0.16 |
| 4 | 0.18 |
| 5 | 0.20 |
| 6 | 0.22 |
| 7 | 0.24 |

TABLE 1-3

Table wherein $\alpha^{HARQ-ACK}$ corresponds to the signaling serial number

| Signaling serial number of $\alpha^{HARQ-ACK}$ | $\alpha^{HARQ-ACK}$ value |
|---|---|
| 0 | 0.1 |
| 1 | 0.12 |
| 2 | 0.14 |
| 3 | 0.16 |
| 4 | 0.18 |
| 5 | 0.20 |
| 6 | 0.22 |
| 7 | 0.24 |

Optionally, when the number of encoding bits of the periodic CSI and the HARQ-ACKSR are determined, as shown in the corresponding Table 1-4, Table 1-5 and Table 1-6, the embodiment of the present disclosure is not limited to the following values.

TABLE 1-4

Table wherein $\beta_{offset}^{CSI}$ corresponds to the signaling serial number

| Signaling serial number of $\beta_{offset}^{CSI}$ | $\beta_{offset}^{CSI}$ value |
|---|---|
| 0 | 4 |
| 1 | 4.5 |
| 2 | 5 |
| 3 | 5.5 |
| 4 | 6 |
| 5 | 6.5 |
| 6 | 7 |
| 7 | 7.5 |
| 8 | 8 |
| 9 | 8.5 |
| 10 | 9 |

TABLE 1-4-continued

Table wherein $\beta_{offset}^{CSI}$ corresponds to the signaling serial number

| Signaling serial number of $\beta_{offset}^{CSI}$ | $\beta_{offset}^{CSI}$ value |
|---|---|
| 11 | 9.5 |
| 12 | 10 |
| 13 | reserved |
| 14 | reserved |
| 15 | reserved |

TABLE 1-5

Table wherein $\alpha^{CSI}$ corresponds to the signaling serial number

| Signaling serial number of $\alpha^{CSI}$ | $\alpha^{CSI}$ value |
|---|---|
| 0 | 0.2 |
| 1 | 0.24 |
| 2 | 0.28 |
| 3 | 0.32 |
| 4 | 0.36 |
| 5 | 0.40 |
| 6 | 0.44 |
| 7 | 0.48 |

TABLE 1-6

Table wherein $\alpha^{HARQ-ACK}$ corresponds to the signaling serial number

| Signaling serial number of $\alpha^{HARQ-ACK}$ | $\alpha^{HARQ-ACK}$ value |
|---|---|
| 0 | 0.2 |
| 1 | 0.24 |
| 2 | 0.28 |
| 3 | 0.32 |
| 4 | 0.36 |
| 5 | 0.40 |
| 6 | 0.44 |
| 7 | 0.48 |

(2) The UE determines the number of bits of the periodic CSI or the HARQ-ACKSR information in the current subframe.

Specifically, the UE performs encoding and modulation according to the determined number of bits to be sent, and the eNB determines the received number of bits and correspondingly performs demodulation and decoding.

(3) The UE determines the number of encoding bits or the number of encoding symbols of the periodic CSI.

(3-1) With an increase in the number of bits of the periodic CSI and the HARQ-ACK/SR information, the first offset value $\beta_{offset}^{CSI}$ will be overlarge, the number of encoding bits or the number of encoding symbols of the periodic CSI is too much, while the number of encoding bits or the number of encoding bits of the HARQ-ACK/SR is much smaller, thereby reducing the performance of the HARQ-ACK/SR. Therefore, it is possible to further introduce a negative adjustment amount based on the number of bits of the periodic CSI and/or the HARQ-ACK/SR information, and the total offset value of the periodic CSI is determined according to the following formula 1.1 or formula 1.2.

$$\beta_{offset}^{CSI} - \alpha^{CSI} \cdot O_{CSI} \qquad \text{formula 1.1}$$

$$\beta_{offset}^{CSI} - \alpha^{CSI} \cdot O_{CSI} - \alpha^{HARQ-ACK} \cdot O_{HARQ-ACK} \qquad \text{formula 1.2}$$

wherein, $O_{CSI}$ represents the number of bits of the periodic CSI in the current subframe, and $O_{HARQ-ACK}$ represents the number of bits of the HARQ-ACK/SR information in the current subframe.

(3-2) According to the number of bits of the periodic CSI in the current subframe, the product of the number of bits of the periodic CSI and the total offset value is obtained according to the following formula 1.3 or the formula 1.4.

$$O_{CSI} \cdot (\beta_{offset}^{CSI} - \alpha^{CSI} \cdot O_{CSI}) \qquad \text{formula 1.3}$$

$$O_{CSI} \cdot (\beta_{offset}^{CSI} - \alpha^{CSI} \cdot O_{CSI} - \alpha^{HARQ-ACK} \cdot O_{HARQ-ACK}) \qquad \text{formula 1.4}$$

Since the above product is not usually an integer, it needs to round the product, for example, rounding up or down to an integer. Rounding up to an integer is taken as an example to describe the embodiment of the present disclosure with reference to the following formula 1.5 or the formula 1.6. The present disclosure also includes the way of rounding down to an integer or other ways of rounding to an integer, which is similar to the rounding up to an integer, without repetition.

$$\lceil O_{CSI} \cdot (\beta_{offset}^{CSI} - \alpha^{CSI} \cdot O_{CSI}) \rceil \qquad \text{formula 1.5}$$

$$\lceil O_{CSI} \cdot (\beta_{offset}^{CSI} - \alpha^{CSI} \cdot O_{CSI} - \alpha^{HARQ-ACK} \cdot O_{HARQ-ACK}) \rceil \qquad \text{formula 1.6}$$

(3-3) In some cases, since the above product after rounding is larger than the maximum number of encoding bits 48 or the maximum number of encoding symbols 24 permitted to be carried by the PUCCH Format 3 information, one maximum threshold value K is preset, so as to ensure that the number of encoding bits or the number of encoding symbols of the periodic CSI after the product is rounded does not exceed K. Additionally, in other cases, since the number of encoding bits or the number of encoding symbols of the periodic CSI after the product is rounded is too small, one minimum threshold value L is preset, so as to ensure that the number of encoding bits or the number of encoding symbols of the periodic CSI after the product is rounded is not lower than L.

Thus, with reference to the formula 1.7 or the formula 1.8, it is possible to obtain that the number of encoding bits or the number of encoding symbols $O'_{CSI}$ of the periodic CSI is:

$$O'_{CSI} = \min(\max(\lceil O_{CSI} \cdot (\beta_{offset}^{CSI} - \alpha^{CSI} \cdot O_{CSI}) \rceil, K), L) \qquad \text{formula 1.7}$$

$$O'_{CSI} = \min(\max(\lceil O_{CSI} \cdot (\beta_{offset}^{CSI} - \alpha^{CSI} \cdot O_{CSI} - \alpha^{HARQ-ACK} \cdot O_{HARQ-ACK}) \rceil, K), L) \qquad \text{formula 1.8}$$

wherein K comprises, but not limited to, 24, 22, 20, etc., or K can be informed or predefined by the signaling; L is equal to, but not limited to, $M \cdot O_{CSI}$, M is equal to, but not limited to 2, or M can be informed or predefined by the signaling.

Optionally, it is also possible not to limit the maximum value and the minimum value of the rounded product by excluding the situation of going beyond the range because the situation of going beyond the range is considered as invalid, and cannot be supported.

(4) According to the number of encoding bits or the number of encoding symbols $O'_{CSI}$ of the periodic CSI, with reference to the following formula 1.9, the UE determines that the number of encoding symbols $O'_{HARQ-ACK}$ of the HARQ-ACK/SR information is that:

$$O'_{HARQ-ACK} = 24 - O'_{CSI} \qquad \text{formula 1.9.}$$

Optionally, according to the number of encoding bits or the number of encoding symbols $O'_{CSI}$ of the periodic CSI, with reference to the following formula 1.10, the UE determines that the number of encoding bits $O'_{HARQ-ACK}$ of the HARQ-ACK/SR information is that:

$$O'_{HARQ-ACK} = 48 - O'_{CSI} \qquad \text{formula 1.10.}$$

In another embodiment, the number of encoding bits or the number of encoding symbols of the periodic CSI is also firstly determined, and then the number of encoding bits or the number of encoding symbols of the HARQ-ACK/SR information is determined.

(1) The adjusting parameter $\chi^{CSI}$ corresponds to the number of bits of the periodic CSI, that is, the number of bits of each kind of periodic CSI corresponds to one value of the adjusting parameter $\chi^{CSI}$. Therefore, the eNB informs the UE of the number of bits of each kind of periodic CSI corresponding to one value of the adjusting parameter $\chi^{CSI}$ by the signaling. When the number of encoding bits of the periodic CSI is determined, the value of $\chi^{CSI}$ is as shown in the following Table 2-1 or Table 2-2.

TABLE 2-1

The number of bits of the periodic CSI and the corresponding $\chi^{CSI}$ value

| Number of bits of periodic CSI | $\chi^{CSI}$ value |
|---|---|
| 1 | 1 |
| 2 | 0.5 |
| 3 | 0.5 |
| 4 | 0.5 |
| 5 | 0.8 |
| 6 | 1.2 |
| 7 | 1.5 |
| 8 | 1.2 |
| 9 | 1.2 |
| 10 | 1 |
| 11 | 1 |

TABLE 2-2

The number of bits of the periodic CSI and the corresponding $\chi^{CSI}$ value

| Number of bits of periodic CSI | $\chi^{CSI}$ value |
|---|---|
| 1 | 2 |
| 2 | 1 |
| 3 | 1 |
| 4 | 1 |
| 5 | 1.6 |
| 6 | 2.4 |
| 7 | 3 |
| 8 | 2.4 |
| 9 | 2.4 |
| 10 | 2 |
| 11 | 2 |

(2) The UE firstly determines the number of bits of the periodic CSI of the current subframe, and the eNB informs the UE of the first offset value $\beta^{CSI}_{offset}$ corresponding to the number of bits of each kind of periodic CSI through the signaling; additionally, the UE determines the number of bits of the periodic CSI of the current subframe, and finds the value of $\chi^{CSI}$ corresponding to the number of bits of the periodic CSI.

(3) The number of encoding bits or the number of encoding symbols O'$_{CSI}$ of the periodic CSI is obtained according to the formula 2.1.

$$O'_{CSI} = \lceil O_{CSI} \cdot (\beta^{CSI}_{offset} \cdot \chi^{CSI}) \rceil \qquad \text{formula 2.1}$$

(4) According to the number of encoding bits or the number of encoding symbols O'$_{CSI}$ of the periodic CSI, with reference to the following formula 2.2, the UE determines that the number of encoding symbols O'$_{HARQ-ACK}$ of the HARQ-ACK/SR information is that:

$$O'_{HARQ-ACK} = 24 - O'_{CSI} \qquad \text{formula 2.2}$$

Optionally, according to the number of encoding bits or the number of encoding symbols O'$_{CSI}$ of the periodic CSI, with reference to the following formula 2.3, the UE determines that the number of encoding bits O'$_{HARQ-ACK}$ of the HARQ-ACK/SR information is that:

$$O'_{HARQ-ACK} = 48 - O'_{CSI} \qquad \text{formula 2.3}$$

The method and the apparatus for encoding uplink control information of the embodiment of the present disclosure can ensure that the total symbol number for encoding modulation of the first uplink control information (for example, the periodic CSI) and the second uplink control information (for example, the HARQ-ACK/SR information) does not exceed the number of encoding symbols which can be carried at most; the demodulating performances of the first uplink control information (for example, the periodic CSI) and the second uplink control information (for example, the HARQ-ACK/SR information) are at relatively approximate operating points, so as to achieve the best optimal performance; in different cases, for example, in the case of including channel and information number of bits, the channel encoding manners of the first uplink control information (for example, the periodic CSI) and the second uplink control information (for example, the HARQ-ACK/SR information) can be used universally.

The method for encoding uplink control information according to another embodiment of the present disclosure will be described in detail in connection with FIG. 4. The specific steps are as follows:

Step 41: the UE determines the number of bits of first uplink control information and the number of bits of second uplink control information;

Step 42: the UE determines a first parameter for channel encoding of the second uplink control information according to the number of bits of the first uplink control information, or determining a second parameter for channel encoding of the second uplink control information according to the number of bits of the first uplink control information and the number of bits of the second uplink control information;

Step 43: the UE determines the number of encoding symbols or the number of encoding bits of the second uplink control information according to the first parameter and the number of bits of the second uplink control information, or determining the number of encoding symbols or the number of encoding bits of the second uplink control information according to the second parameter and the number of bits of the second uplink control information;

Step 44: the UE encodes the second uplink control information according to the number of encoding symbols or the number of encoding bits of the second uplink control information so as to send the encoded second uplink control information to the base station on the physical uplink control channel.

Additionally, since the number of encoding symbols or the number of encoding bits of the second uplink control information is determined in the foregoing steps, it is possible to determine the number of encoding symbols or the number of encoding bits of the first uplink control information according to the number of encoding symbols or the number of encoding bits of the second uplink control information, and then to encode the first uplink control information according to the number of encoding symbols or the number of encoding bits of the first uplink control information, so as to send the encoded first uplink control information to the base station on the physical uplink control channel.

When the first uplink control information is the periodic CSI and the second uplink control information is the HARQ- ACK/SR information, the UE determines that the first parameter for channel encoding of the HARQ-ACK/SR information is $\beta^{HARQ-ACK}_{offset} \cdot \alpha^{CSI} \cdot I_{CSI}$ according to the number of bits $O_{CSI}$ of the periodic CSI, wherein $\beta^{HARQ-ACK}_{offset}$ is the first offset value of the HARQ-ACK/SR information, $\alpha^{CSI}$ is the coefficient of the second offset value of the periodic CSI, $\beta^{HARQ-ACK}_{offset}$ and $\alpha^{CSI}$ can be configured by the signaling of the base station; or the UE determines that the second parameter for channel encoding of the HARQ-ACK/SR information is $\beta^{HARQ-ACK}_{offset} \cdot \alpha^{CSI} \cdot O_{CSI} \cdot \alpha^{HARQ-ACK} \cdot O_{HARQ-ACK}$ according to the number of bits $O_{CSI}$ of the periodic CSI and the number of bits $O_{HARQ-ACK}$ of the HARQ-ACK/SR information, wherein $\beta^{HARQ-ACK}_{offset}$ is the first offset value of the HARQ-ACK/SR information, $\alpha^{CSI}$ is the coefficient of the second offset value of the periodic CSI, $\alpha^{HARQ-ACK}$ is the coefficient of the third offset value of the HARQ-ACK/SR information, and $\beta^{HARQ-ACK}_{offset}$, $\alpha^{CSI}$ and $\alpha^{HARQ-ACK}$ can be configured by the signaling of the base station. Optionally, the UE determines that the first parameter for channel encoding of the HARQ-ACK/SR information is $\beta^{HARQ-ACK}_{offset} \cdot \chi^{CSI}$ according to the number of bits $O_{CSI}$ of the periodic CSI, wherein $\chi^{CSI}$ is an adjusting parameter $\chi^{CSI}$ of the periodic CSI corresponding to the number of bits $O_{CSI}$ of the periodic CSI, and $\beta^{HARQ-ACK}_{offset}$ can be the first offset value of the HARQ-ACK/SR information which can be configured by the signaling of the base station.

Specifically, upon the simultaneous transmission of the periodic CSI and the HARQ-ACK/SR information, the steps of determining the number of encoding bits or the number of encoding symbols of the periodic CSI and the HARQ-ACK/SR information are as follows. Herein, there does not exist any dependent relationship among part of the steps, and the steps can be performed in a random order.

In the following embodiments, the number of encoding bits or the number of encoding symbols of the HARQ-ACK/SR information is firstly determined, and then the number of encoding bits or the number of encoding symbols of the periodic CSI is determined.

(1) The eNB informs the UE of determining a offset value set for channel encoding of the periodic CSI and the HARQ-ACK/SR information through the signaling. Herein, the above signaling includes, but not limited to, a high layer signaling or a physical layer signaling, for example, the informing manner of the high layer signaling includes, but not limited to, cell-specific high layer signaling or UE-specific high layer signaling.

As stated above, the offset value set at least contains the first offset value $\beta^{HARQ-ACK}_{offset}$ of the HARQ-ACK/SR information and the coefficient $\alpha^{CSI}$ of the second offset value. According to a table wherein a predefined serial number of the signaling corresponds to the first offset value $\beta^{HARQ-ACK}_{offset}$ and the coefficient $\alpha^{CSI}$ of the second offset value, as shown in Table 3-1 and Table 3-2, the specific first offset value $\beta^{HARQ-ACK}_{offset}$ and the coefficient $\alpha^{CSI}$ of the second offset value are determined.

Further, the offset value set also contains a coefficient $\alpha^{HARQ-ACK}$ of the third offset value. According to a table wherein a predefined serial number of the signaling corresponds to the coefficient $\alpha^{HARQ-ACK}$ of the third offset value, as shown in Table 3-3, the specific coefficient $\alpha^{HARQ-ACK}$ of the third offset value is determined.

When the number of encoding symbols of the periodic CSI and the HARQ-ACK/SR are determined, as shown in the corresponding Table 3-1, Table 3-2 and Table 3-3, the embodiment of the present disclosure is not limited to the following values.

TABLE 3-1

Table wherein $\beta_{offset}^{HARQ-ACK}$ corresponds to the signaling serial number

| Signaling serial number of $\beta_{offset}^{CSI}$ | $\beta_{offset}^{CSI}$ value |
|---|---|
| 0 | 8 |
| 1 | 8.5 |
| 2 | 9 |
| 3 | 9.5 |
| 4 | 10 |
| 5 | 10.5 |
| 6 | 11 |
| 7 | 11.5 |
| 8 | 12 |
| 9 | 12.5 |
| 10 | 13 |
| 11 | 13.5 |
| 12 | 14 |
| 13 | 14.5 |
| 14 | 15 |
| 15 | reserved |

TABLE 3-2

Table wherein $\alpha^{CSI}$ corresponds to the signaling serial number

| Signaling serial number of $\alpha^{CSI}$ | $\alpha^{CSI}$ value |
|---|---|
| 0 | 2 |
| 1 | 2.5 |
| 2 | 3 |
| 3 | 3.5 |
| 4 | 4 |
| 5 | 4.5 |
| 6 | 5 |
| 7 | 5.5 |

TABLE 3-3

Table wherein $\alpha^{HARQ-ACK}$ corresponds to the signaling serial number

| Signaling serial number of $\alpha^{HARQ-ACK}$ | $\alpha^{HARQ-ACK}$ value |
|---|---|
| 0 | 2 |
| 1 | 2.5 |
| 2 | 3 |
| 3 | 3.5 |
| 4 | 4 |
| 5 | 4.5 |
| 6 | 5 |
| 7 | 5.5 |

Optionally, when the number of encoding bits of the periodic CSI and the HARQ-ACK/SR are determined, as shown in the corresponding Table 3-4, Table 3-5 and Table 3-6, the embodiment of the present disclosure is not limited to the following values.

TABLE 3-4

Table wherein $\beta_{offset}^{CSI}$ corresponds to the signaling serial number

| Signaling serial number of $\beta_{offset}^{CSI}$ | $\beta_{offset}^{CSI}$ value |
|---|---|
| 0 | 16 |
| 1 | 17 |
| 2 | 18 |
| 3 | 19 |
| 4 | 20 |
| 5 | 21 |
| 6 | 22 |
| 7 | 23 |

TABLE 3-4-continued

Table wherein $\beta_{offset}^{CSI}$ corresponds to the signaling serial number

| Signaling serial number of $\beta_{offset}^{CSI}$ | $\beta_{offset}^{CSI}$ value |
|---|---|
| 8 | 24 |
| 9 | 25 |
| 10 | 26 |
| 11 | 27 |
| 12 | 28 |
| 13 | 29 |
| 14 | 30 |
| 15 | reserved |

TABLE 3-5

Table wherein $\alpha^{CSI}$ corresponds to the signaling serial number

| Signaling serial number of $\alpha^{CSI}$ | $\alpha^{CSI}$ value |
|---|---|
| 0 | 4 |
| 1 | 5 |
| 2 | 6 |
| 3 | 7 |
| 4 | 8 |
| 5 | 9 |
| 6 | 10 |
| 7 | 11 |

TABLE 3-6

Table wherein $\alpha^{HARQ-ACK}$ corresponds to the signaling serial number

| Signaling serial number of $\alpha^{HARQ-ACK}$ | $\alpha^{HARQ-ACK}$ value |
|---|---|
| 0 | 4 |
| 1 | 5 |
| 2 | 6 |
| 3 | 7 |
| 4 | 8 |
| 5 | 9 |
| 6 | 10 |
| 7 | 11 |

(2) The UE determines the number of bits of the periodic CSI and the HARQ-ACK/SR information in the current subframe.

Specifically, the UE performs encoding and modulation according to the determined number of bits to be sent, and the eNB determines the received number of bits and correspondingly performs demodulation and decoding.

(3) The UE determines the number of encoding bits or the number of encoding symbols of the HARQ-ACK/SR information.

(3-1) The total offset value of the periodic HARQ-ACK/SR information is determined according to the following formula 3.1 or formula 3.2.

$$\beta^{HARQ-ACK}_{offset} - \alpha^{CSI} \cdot O_{CSI} \qquad \text{formula 3.1}$$

$$\beta^{HARQ-ACK}_{offset} - \alpha^{CSI} \cdot O_{CSI} - \alpha^{HARQ-ACK} \cdot O_{HARQ-ACK} \qquad \text{formula 3.2}$$

wherein, $O_{CSI}$ represents the number of bits of the periodic CSI in the current subframe, and $O_{HARQ-ACK}$ represents the number of bits of the HARQ-ACK/SR information in the current subframe.

(3-2) According to the number of bits of the HARQ-ACK/SR information in the current subframe, the product of the number of bits of the HARQ-ACK/SR information and the total offset value is obtained according to the following formula 3.3 or the formula 3.4.

$$O_{HARQ-ACK} \cdot (\beta^{HARQ-ACK}_{offset} - \alpha^{CSI} \cdot O_{CSI}) \qquad \text{formula 3.3}$$

$$O_{HARQ-ACK} \cdot (\beta^{HARQ-ACK}_{offset} - \alpha^{CSI} \cdot O_{CSI} - \alpha^{HARQ-ACK} \cdot O_{HARQ-ACK}) \qquad \text{formula 3.4}$$

Since the above product is not usually an integer, it needs to round the product, for example, rounding up or down to an integer. Rounding up to an integer is taken as an example to describe the embodiment of the present disclosure with reference to the following formula 3.5 or the formula 3.6 and other ways of rounding to an integer are not repeated here.

$$\lceil O_{HARQ-ACK} \cdot (\beta^{HARQ-ACK}_{offset} - \alpha^{CSI} \cdot O_{CSI}) \rceil \qquad \text{formula 3.5}$$

$$\lceil O_{HARQ-ACK} \cdot (\beta^{HARQ-ACK}_{offset} - \alpha^{CSI} \cdot O_{CSI} - \alpha^{HARQ-ACK} \cdot O_{HARQ-ACK}) \rceil \qquad \text{formula 3.6}$$

(3-3) In some cases, since the above product after rounding is larger than the maximum number of encoding bits 48 or the maximum number of encoding symbols 24 permitted to be carried by the PUCCH Format 3 information, one maximum threshold value K is preset, so as to ensure that the number of encoding bits or the number of encoding symbols of the HARQ-ACK/SR information after the product is rounded does not exceed K. Additionally, in other cases, since the number of encoding bits or the number of encoding symbols of the HARQ-ACK/SR information after the product is rounded is too small, one minimum threshold value L is preset, so as to ensure that the number of encoding bits or the number of encoding symbols of the HARQ-ACK/SR information after the product is rounded is not lower than L.

Thus, with reference to the formula 3.7 or the formula 3.8, it is possible to obtain that the number of encoding bits or the number of encoding symbols $O'_{CSI}$ of the HARQ-ACK/SR information is:

$$O'_{HARQ-ACK} = \min(\max(\lceil O_{HARQ-ACK} \cdot (\beta^{HARQ-ACK}_{offset} - \alpha^{CSI} \cdot O_{CSI}) \rceil, K), L) \qquad \text{formula 3.7}$$

$$O'_{HARQ-ACK} = \min(\max(\lceil O_{HARQ-ACK} \cdot (\beta^{HARQ-ACK}_{offset} - \alpha^{CSI} \cdot O_{CSI} - \alpha HARQ-ACK \cdot O_{HARQ-ACK}) \rceil, K), L) \qquad \text{formula 3.8}$$

wherein K is equal to, but not limited to, 24, 22, 20, etc, or K can be informed or predefined by the signaling; L is equal to, but not limited to, $M \cdot O_{CSI}$, M is equal to, but not limited to 2, or M can be informed or predefined by the signaling.

Optionally, it is also possible not to limit the maximum value and the minimum value of the rounded product by excluding the situation of going beyond the range.

(4) According to the number of encoding bits or the number of encoding symbols $O'_{HARQ-ACK}$ of the HARQ-ACK/SR information, with reference to the following formula 3.9, the number of encoding symbols $O'_{CSI}$ of the periodic CSI is determined to be:

$$O'_{CSI} = 24 - O'_{HARQ-ACK} \qquad \text{formula 3.9.}$$

Optionally, according to the number of encoding bits or the number of encoding symbols $O'_{HARQ-ACK}$ of the HARQ-ACK/SR information, with reference to the following formula 3.10, the number of encoding bits $O'_{CSI}$ of the periodic CSI is that:

$$O'_{CSI} = 48 - O'_{HARQ-ACK} \qquad \text{formula 3.10.}$$

In another embodiment, the number of encoding bits or the number of encoding symbols of the HARQ-ACK/SR information is also firstly determined, and then the number of encoding bits or the number of encoding symbols of the periodic CSI is determined.

(1) The adjusting parameter $\chi^{CSI}$ corresponds to the number of bits of the periodic CSI, that is, the number of bits of each kind of periodic CSI corresponds to one value of the adjusting parameter $\chi^{CSI}$. Therefore, the eNB informs the UE of the number of bits of each kind of periodic CSI corresponding to one value of $\chi^{CSI}$ by the signaling. When the number of encoding bits of the HARQ-ACK/SR information is determined, the value of $\chi^{CSI}$ is as shown in the following Table 4-1 or Table 4-2.

TABLE 4-1

The number of bits of the periodic CSI and the corresponding $\chi^{CSI}$ value

| Number of bits of the periodic CSI | $\chi^{CSI}$ value |
|---|---|
| 1 | 1 |
| 2 | 2 |
| 3 | 2.5 |
| 4 | 3.5 |
| 5 | 3.5 |
| 6 | 3.5 |
| 7 | 4 |
| 8 | 4.5 |
| 9 | 4.5 |
| 10 | 5 |
| 11 | 5 |

TABLE 4-2

The number of bits of the periodic CSI and the corresponding $\chi^{CSI}$ value

| The number of bits of the periodic CSI | $\chi^{CSI}$ value |
|---|---|
| 1 | 2 |
| 2 | 4 |
| 3 | 5 |
| 4 | 7 |
| 5 | 7 |
| 6 | 7 |
| 7 | 8 |
| 8 | 9 |
| 9 | 9 |
| 10 | 10 |
| 11 | 10 |

(2) The UE determines the number of bits of the periodic CSI of the current subframe, and finds the value of the adjusting parameter $\chi^{CSI}$ corresponding to the number of bits of the periodic CSI. $\beta^{HARQ\text{-}ACK}_{offset}$ can be obtained with reference to Table 3-1 and Table 3-4.

(3) The number of encoding bits or the number of encoding symbols $O'_{HARQ\text{-}ACK}$ of the HARQ-ACK/SR is obtained according to the formula 4.1.

$$O'_{HARQ\text{-}ACK} = [O_{HARQ\text{-}ACK} \cdot (\beta^{HARQ\text{-}ACK}_{offset} - \chi^{CSI})] \quad \text{formula 4.1}$$

(4) According to the number of encoding bits or the number of encoding symbols $O'_{HARQ\text{-}ACK}$ of the HARQ-ACK/SR information, with reference to the following formula 4.2, the number of encoding symbols $O'_{CSI}$ of the periodic CSI is that:

$$O'_{CSI} = 24 - O'_{HARQ\text{-}ACK} \quad \text{formula 4.2.}$$

Optionally, according to the number of encoding bits or the number of encoding symbols $O'_{HARQ\text{-}ACK}$ of the HARQ-ACK/SR information, with reference to the following formula 4.3, the number of encoding bits $O'_{CSI}$ of the periodic CSI is that:

$$O'_{CSI} = 48 - O'_{HARQ\text{-}ACK} \quad \text{formula 4.3}$$

The method and the apparatus for encoding uplink control information of the embodiment of the present disclosure can ensure that the total symbol number for encoding modulation of the first uplink control information (for example, the periodic CSI) and the second uplink control information (for example, the HARQ-ACK/SR information) does not exceed the number of encoding symbols which can be carried at most; the demodulating performances of the first uplink control information (for example, the periodic CSI) and the second uplink control information (for example, the HARQ-ACK/SR information) are at relatively approximate operating points, so as to achieve the best optimal performance; in different cases, for example, in the case of including channel and information number of bits, the channel encoding manners of the first uplink control information (for example, the periodic CSI) and the second uplink control information (for example, the HARQ-ACK/SR information) can be used universally.

Optionally, in the following yet another embodiment, the number of encoding bits or the number of encoding symbols of the HARQ-ACK/SR information are also firstly determined, and then the number of encoding bits or the number of encoding symbols of the periodic CSI are determined.

(1) The coefficient $\alpha^{CSI}$ of the second offset value corresponds to the number of bits of the periodic CSI, that is, the number of bits of each kind of periodic CSI corresponds to the coefficient $\alpha^{CSI}$ of one second offset value.

(2) The UE determines the number of bits of the HARQ-ACK/SR information of the current subframe, and finds the corresponding first offset value $\beta^{HARQ\text{-}ACK}_{offset}$. In addition, the UE determines the number of bits of the periodic CSI of the current subframe, and finds the corresponding coefficient $\alpha^{CSI}$ of the second offset value. Herein, the first offset value $\beta^{HARQ\text{-}ACK}_{offset}$ and the coefficient $\alpha^{CSI}$ of the second offset value are determined with reference to Table 3-1 to Table 3-6.

(3) The number of encoding bits or the number of encoding symbols $O'_{HARQ\text{-}ACK}$ of the HARQ-ACK/SR is obtained according to the formula 5.1.

$$O'_{HARQ\text{-}ACK} = [O_{HARQ\text{-}ACK} \cdot \beta^{HARQ\text{-}ACK}_{offset} - \alpha^{CSI} \cdot O_{CSI}] \quad \text{formula 5.1.}$$

Optionally, according to the number of encoding bits or the number of encoding symbols $O'_{HARQ\text{-}ACK}$ of the HARQ-ACK/SR information, with reference to formula 5.3, the number of encoding bits $O'_{CSI}$ of the periodic CSI is determined as follows:

$$O'_{CSI} = 48 - O'_{HARQ\text{-}ACK} \quad \text{formula 5.3.}$$

(4) According to the number of encoding bits or the number of encoding symbols $O'_{HARQ\text{-}ACK}$ of the HARQ-ACK/SR information, with reference to the following formula 5.2, the number of encoding bits or the number of encoding symbols $O'_{CSI}$ of the periodic CSI is that:

$$O'_{CSI} = 24 - O'_{HARQ\text{-}ACK} \quad \text{formula 5.2.}$$

When the periodic CSI and the HARQ-ACK/SR information are transmitted at the same time, the resource occupied by the HARQ-ACK/SR information originally is occupied by the periodic CSI, which thus lowers the demodulating performance of the HARQ-ACK/SR information. Through the power control, under the circumstance where the periodic CSI and the HARQ-ACK/SR information are transmitted at the same time, the performance of the HARQ-ACK/SR is equivalent to that of the HARQ-ACK/SR when transmitted separately.

Like other PUCCH formats, the power control of the PUCCH Format 3 can also be adjusted according to the number of bits of the transmitted information in the current subframe.

After the number of encoding bits $O'_{HARQ\text{-}ACK}$ of the HARQ-ACK/SR information is determined, the power adjusting value $h(n_{CSI}, n_{HARQ}, n_{SR})$ of the HARQ-ACK/SR information is determined. For example, when the UE is configured to perform transmission at two antenna ports by the high layer or when the UE transmits more than 11 bits, $$h(n_{CSI}, n_{HARQ}, n_{SR}) = \frac{n_{HARQ} + n_{SR} - 1}{3} + \frac{n_{CSI}}{r} \quad \text{formula 6.1}$$

in other cases, $$h(n_{CSI}, n_{HARQ}, n_{SR}) = \frac{n_{HARQ} + n_{SR} - 1}{2} + \frac{n_{CSI}}{p} \quad \text{formula 6.2}$$

wherein, $h(n_{CSI}, n_{HARQ}, n_{SR})$ is a power adjusting value, $n_{CSI}$ is information number of bits of the CSI (including information such as CQI, PMI, RI, etc.); $n_{HARQ}$ is information number of bits of the HARQ-ACK information. If the current subframe is used to transmit the SR information and does not have any transmission block of the associated physical uplink shared channel, $n_{SR}=1$; otherwise, $n_{SR}=0$., $r$, $P$ are equal to, but not limited to, the values of 3, 4, 5, 6, etc.

Optionally, for example, when the UE is configured to perform transmission at two antenna ports by the high layer or when the UE transmits more than 11 bits, $$h(n_{CSI}, n_{HARQ}, n_{SR}) = \frac{n_{HARQ} + n_{SR} - 1}{3} + \frac{10\log_{10}\left(\frac{48}{O'_{HARQ-ACK}}\right)}{r}$$

in other cases, $$h(n_{CSI}, n_{HARQ}, n_{SR}) = \frac{n_{HARQ} + n_{SR} - 1}{2} + \frac{10\log_{10}\left(\frac{48}{O'_{HARQ-ACK}}\right)}{p}$$

wherein, $h(n_{CSI}, n_{HARQ}, n_{SR})$ is a power adjusting value, $n_{CSI}$ is information number of bits of the CSI (including information such as CQI, PMI, RI, etc.); $n_{HARQ}$ is information number of bits of the HARQ-ACK information. If the current subframe is used to transmit the SR information and does not have any transmission block of the associated physical uplink shared channel, $n_{SR}=1$; otherwise, $n_{SR}=0$., $r$, $P$ are equal to, but not limited to, the values of 1, 1.25, 1.5, 1.75, etc.

Through the power control, it is ensured that when the periodic CSI and the HARQ-ACK/SR information are transmitted at the same time, the performance of the HARQ-ACK/SR is equivalent to that of the HARQ-ACK/SR when transmitted separately.

Figure 5:
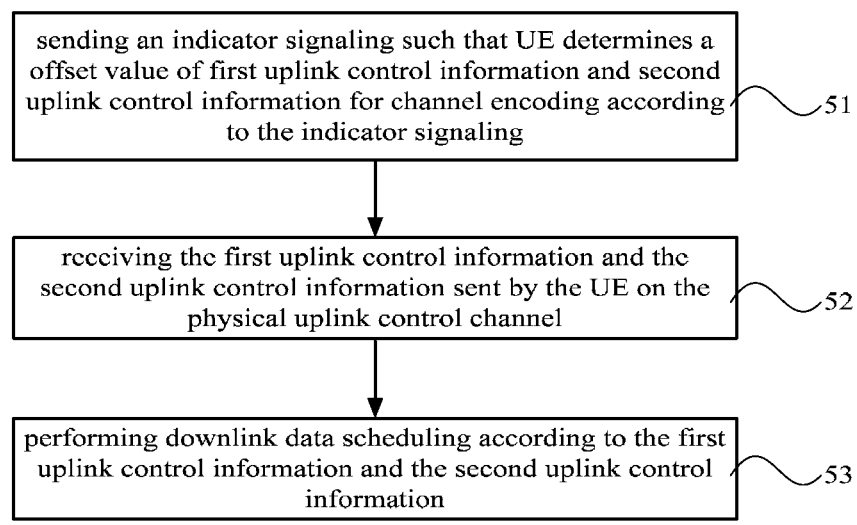
FIG. 5 is a flow chart of the method for transmitting uplink control information on a physical uplink control channel according to yet another embodiment of the present disclosure.

Correspondingly, as shown in FIG. 5, the method for transmitting uplink control information on the physical uplink control channel according to the embodiment of the present disclosure, realized at the base station side, includes:

Step 51: the base station sends an indicator signaling such that user equipment UE determines a offset value of first uplink control information and second uplink control information for channel encoding according to the indicator signaling;

Step 52: the base station receives the first uplink control information and the second uplink control information sent by the UE on the physical uplink control channel, wherein the first uplink control information and the second uplink control information are obtained according to encoding the number of encoding symbols or the number of encoding bits of the first uplink control information as well as the number of encoding symbols or the number of encoding bits of the second uplink control information, the number of encoding symbols or the number of encoding bits of the first uplink control information as well as the number of encoding symbols or the number of encoding bits of the second uplink control information are determined according to the offset value as well as the first uplink control information and the second uplink control information;

Step 53: the base station performs downlink data scheduling according to the first uplink control information and the second uplink control information.

Under the circumstance where the first uplink control information is the periodic CSI and the second uplink control information is the HARQ-ACK/SR information, the periodic CSI and the HARQ-ACK/SR information are obtained according to the encoding of the number of encoding symbols or the number of encoding bits $O'_{CSI}$ of the periodic CSI as well as the number of encoding symbols or the number of encoding bits $O'_{HARQ-ACK}$ of the HARQ-ACK/SR information, and the number of encoding symbols or the number of encoding bits $O'_{CSI}$ of the of the periodic CSI as well as the number of encoding symbols or the number of encoding bits $O'_{HARQ-ACK}$ of the HARQ-ACK/SR information are determined according to the offset value as well as the number of bits $O_{CSI}$ of the periodic CSI and the number of bits $O_{HARQ-ACK}$ of the HARQ-ACK/SR information.

The method for transmitting uplink control information on a physical uplink control channel of the embodiment of the present disclosure can ensure that the total symbol number for encoding modulation of the periodic CSI and the HARQ-ACK/SR information does not exceed the number of encoding symbols which can be carried at most; the demodulating performances of the periodic CSI and the HARQ-ACK/SR information are at relatively approximate operating points, so as to achieve the best optimal performance; in different cases, for example, in the case of including channel and information number of bits, the channel encoding manners of the periodic CSI and the HARQ-ACK/SR information can be used universally.

Figure 6:
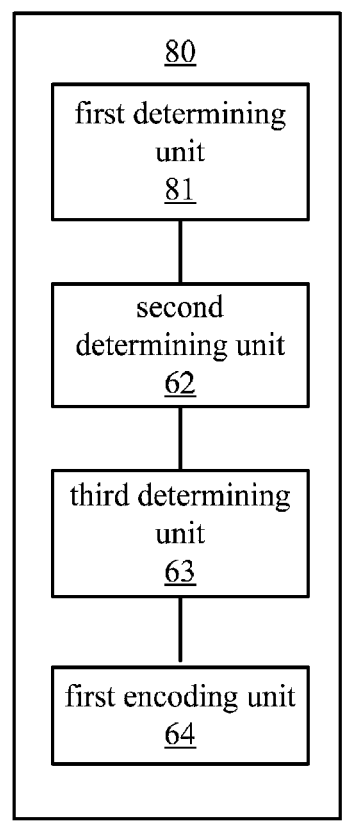
FIG. 6 is a structure schematic diagram of the apparatus for encoding uplink control information according to the embodiment of the present disclosure.

The apparatus for encoding uplink control information according to the embodiment of the present disclosure will be described in detail in connection with FIG. 6. As shown in FIG. 6, the apparatus 60 for transmitting uplink control information on physical uplink control channel includes a first determining unit 61, a second determining unit 62, a third determining unit 63 and a first encoding unit 64.

Herein, the first determining unit 61 is used for determining the number of bits of first uplink control information or determining the number of bits of the first uplink control information and the number of bits of second uplink control information. The second determining unit 62 is used for determining a first parameter for channel encoding of the first uplink control information according to the number of bits of the first uplink control information, or determining a second parameter for channel encoding of the first uplink control information according to the number of bits of the first uplink control information and the number of bits of the second uplink control information. The third determining unit 63 is used for determining the number of encoding symbols or the number of encoding bits of the first uplink control information according to the first parameter and the number of bits of the first uplink control information, or determining the number of encoding symbols or the number of encoding bits of the first uplink control information according to the second parameter and the number of bits of the first uplink control information. The first encoding unit 64 is used for encoding the first uplink control information according to the number of encoding symbols or the number of encoding bits of the first uplink control information determined by the third determining unit.

Figure 7:
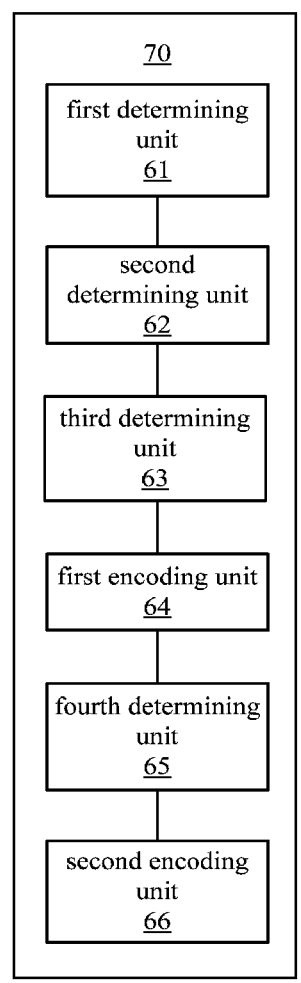
FIG. 7 is a structure schematic diagram of the apparatus for encoding uplink control information according to the embodiment of the present disclosure.

Optionally, as shown in FIG. 7, the apparatus 70 for encoding uplink control information further includes: a fourth determining unit 65 and a second encoding unit 66, wherein the fourth determining unit 65 determines the number of encoding symbols or the number of encoding bits of the second uplink control information according to number of encoding symbols or the number of encoding bits of the first uplink control information determined by the third determining unit 63, and the second encoding unit 66 is used for encoding the second uplink control information according to the number of encoding symbols or the number of encoding bits of the second uplink control information.

Optionally, when the first uplink control information is the periodic CSI and the second uplink control information is the HARQ-ACK/SR information, the second determining unit 62 is specifically used for determining that the first parameter for channel encoding of the periodic CSI is $\beta^{CSI}_{offset} \cdot \alpha^{CSI} \cdot O_{CSI}$ according to the number of bits $O_{CSI}$ of the periodic CSI, wherein $\beta^{CSI}_{offset}$ is the first offset value of the periodic CSI and $\alpha^{CSI}$ is the coefficient of the second offset value of the periodic CSI, $\beta^{CSI}_{offset}$ and $\alpha^{CSI}$ can be configured by the signaling of the base station; or determining that the second parameter for channel encoding of the periodic CSI is $\beta^{CSI}_{offset} \cdot \alpha^{CSI} \cdot O_{CSI} \cdot \alpha^{HARQ-ACK} \cdot O_{HARQ-ACK}$ according to the number of bits $O_{CSI}$ of the periodic CSI and the number of bits $O_{HARQ-ACK}$ of the HARQ-ACK/SR information, wherein $\beta^{CSI}_{offset}$ is the first offset value of the periodic CSI, $\alpha^{CSI}$ is the coefficient of the second offset value of the periodic CSI, and $\alpha^{HARQ-ACK}$ is the coefficient of the third offset value of the HARQ-ACK/SR information, and $\beta^{CSI}_{offset}$, $\alpha^{CSI}$ and $\alpha^{HARQ-ACK}$ can be configured by the signaling of the base station.

Optionally, the second determining unit 62 is further specifically used for determining that the first parameter for channel encoding of the periodic CSI is $\beta^{CSI}_{offset} \cdot \chi^{CSI}$ according to the number of bits $O_{CSI}$ of the periodic CSI, wherein $\chi^{CSI}$ is an adjusting parameter $\chi^{CSI}$ of the periodic CSI corresponding to the number of bits $O_{CSI}$ of the periodic CSI, and $\beta^{CSI}_{offset}$ can be the first offset value of the periodic CSI configured by the signaling of the base station.

Figure 3:
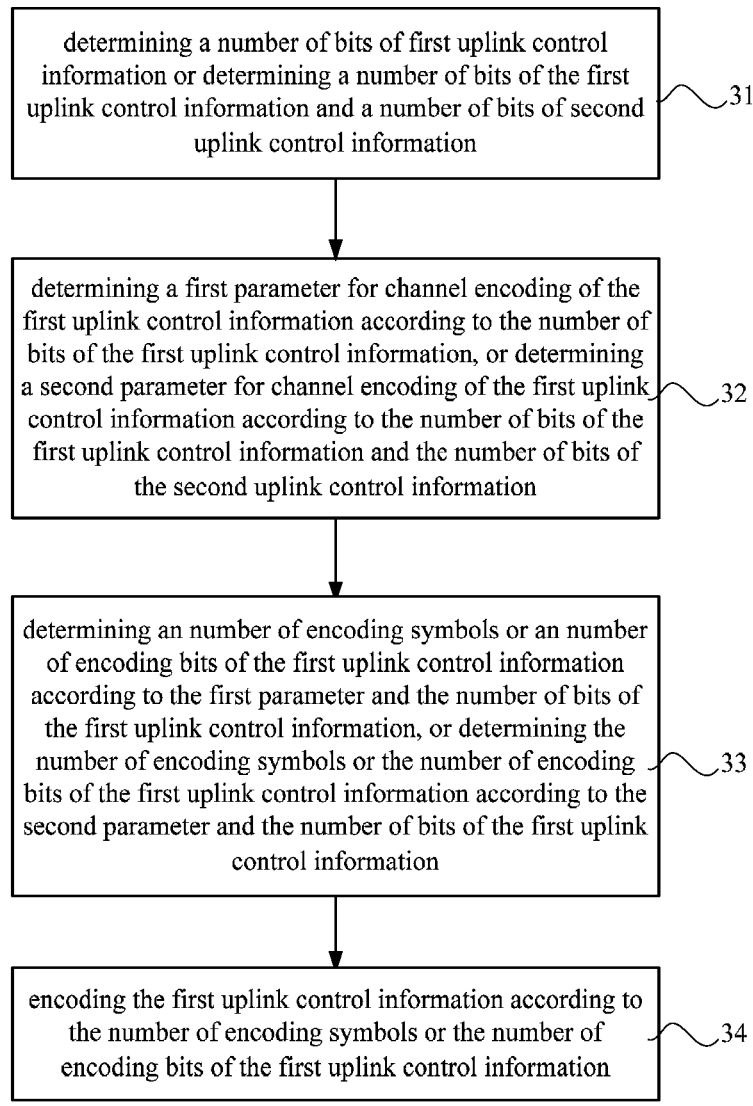
FIG. 3 is a flow chart of the method for encoding uplink control information according to the embodiment of the present disclosure.

Additionally, the process of determining the number of encoding symbols or the number of encoding bits $O'_{CSI}$ of the periodic CSI by the third determining unit 63 is as shown in the method flow in FIG. 3. The process of determining the number of encoding symbols or the number of encoding bits $O'^{HARQ-ACK}$ of the HARQ-ACK/SR information by the fourth determining unit 65 is as shown in the method flow in FIG. 3.

Figure 8:
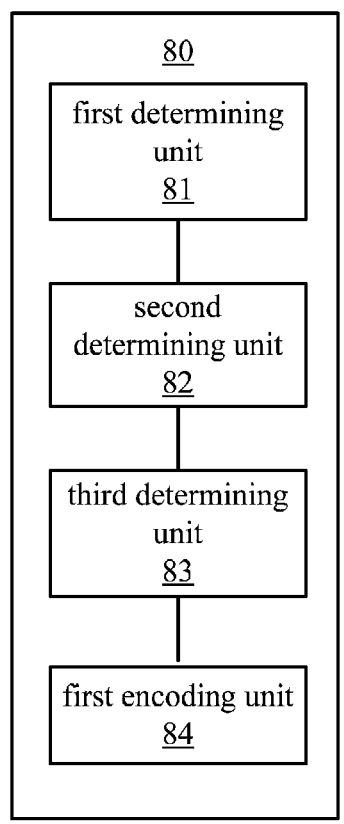
FIG. 8 is a structure schematic diagram of the apparatus for encoding uplink control information according to another embodiment of the present disclosure.

The apparatus for encoding uplink control information according to the embodiment of the present disclosure will be described in detail in connection with FIG. 8. As shown in FIG. 8, the apparatus 80 for transmitting uplink control information on physical uplink control channel includes a first determining unit 81, a second determining unit 82, a third determining unit 83 and a first encoding unit 84.

Herein, the first determining unit 81 is used for determining the number of bits of first uplink control information and the number of bits of second uplink control information. The second determining unit 82 is used for determining a first parameter for channel encoding of the second uplink control information according to the number of bits of the first uplink control information, or determining a second parameter for channel encoding of the second uplink control information according to the number of bits of the first uplink control information and the number of bits of the second uplink control information. The third determining unit 83 is used for determining the number of encoding symbols or the number of encoding bits of the second uplink control information according to the first parameter and the number of bits of the second uplink control information, or determining the number of encoding symbols or the number of encoding bits of the second uplink control information according to the second parameter and the number of bits of the second uplink control information. The first encoding unit 84 is used for encoding the second uplink control information according to the number of encoding symbols or the number of encoding bits of the second uplink control information.

Figure 9:
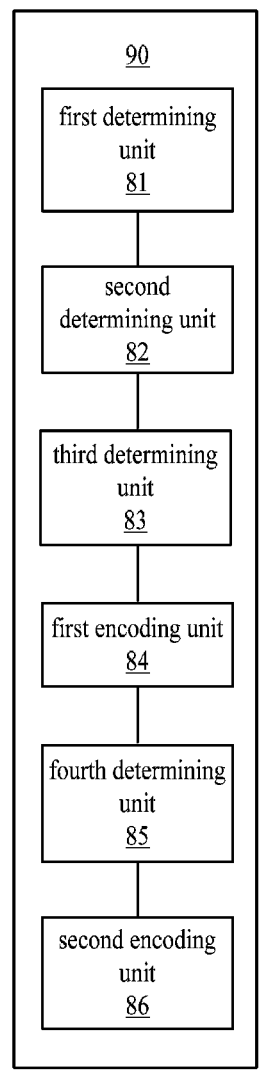
FIG. 9 is a structure schematic diagram of the apparatus for encoding uplink control information according to another embodiment of the present disclosure.

Optionally, as shown in FIG. 9, the apparatus 90 for encoding uplink control information further includes: a fourth determining unit 85 and a second encoding unit 86, wherein the fourth determining unit 85 is used for determining the number of encoding symbols or the number of encoding bits of the first uplink control information according to number of encoding symbols or the number of encoding bits of the second uplink control information, and the second encoding unit 86 is used for encoding the first uplink control information according to the number of encoding symbols or the number of encoding bits of the first uplink control information.

Optionally, when the first uplink control information is the periodic CSI and the second uplink control information is the HARQ-ACK/SR information, the second determining unit 82 is specifically used for determining that the first parameter for channel encoding of the HARQ-ACK/SR information is $\beta^{HARQ-ACK}_{offset} \cdot \alpha^{CSI} \cdot O_{CSI}$ according to the number of bits $O_{CSI}$ of the periodic CSI, wherein $\beta^{HARQ-ACK}_{offset}$ is the first offset value of the HARQ-ACK/SR information, $\alpha^{CSI}$ is the coefficient of the second offset value of the periodic CSI, $\beta^{HARQ-ACK}_{offset}$ and $\alpha^{CSI}$ can be configured by the signaling of the base station; or determining that the second parameter for channel encoding of the HARQ-ACK/SR information is $\beta^{HARQ-ACK}_{offset} \cdot \alpha^{CSI} \cdot O_{CSI} \cdot \alpha^{HARQ-ACK} \cdot O_{HARQ-ACK}$ according to the number of bits $O_{CSI}$ of the periodic CSI and the number of bits $O_{HARQ-ACK}$ of the HARQ-ACK/SR information, wherein $\beta^{HARQ-ACK}_{offset}$ is the first offset value of the HARQ-ACK/SR information, $\alpha^{CSI}$ is the coefficient of the second offset value of the periodic CSI, $\alpha^{HARQ-ACK}$ is the coefficient of the third offset value of the HARQ-ACK/SR information, and $\beta^{HARQ-ACK}_{offset}$, $\alpha^{CSI}$ and $\alpha^{HARQ-ACK}$ can be configured by the signaling of the base station.

Optionally, the second determining unit 82 is further specifically used for determining that the first parameter for channel encoding of the HARQ-ACK/SR information is $\beta^{HARQ-ACK}_{offset} \cdot \chi^{CSI}$ according to the number of bits $O_{CSI}$ of the periodic CSI, wherein $\chi^{CSI}$ is an adjusting parameter $\chi^{CSI}$ of the periodic CSI corresponding to the number of bits $O_{CSI}$ of the periodic CSI, and $\beta^{HARQ-ACK}_{offset}$ can be the first offset value of the HARQ-ACK/SR information configured by the signaling of the base station.

Figure 4:
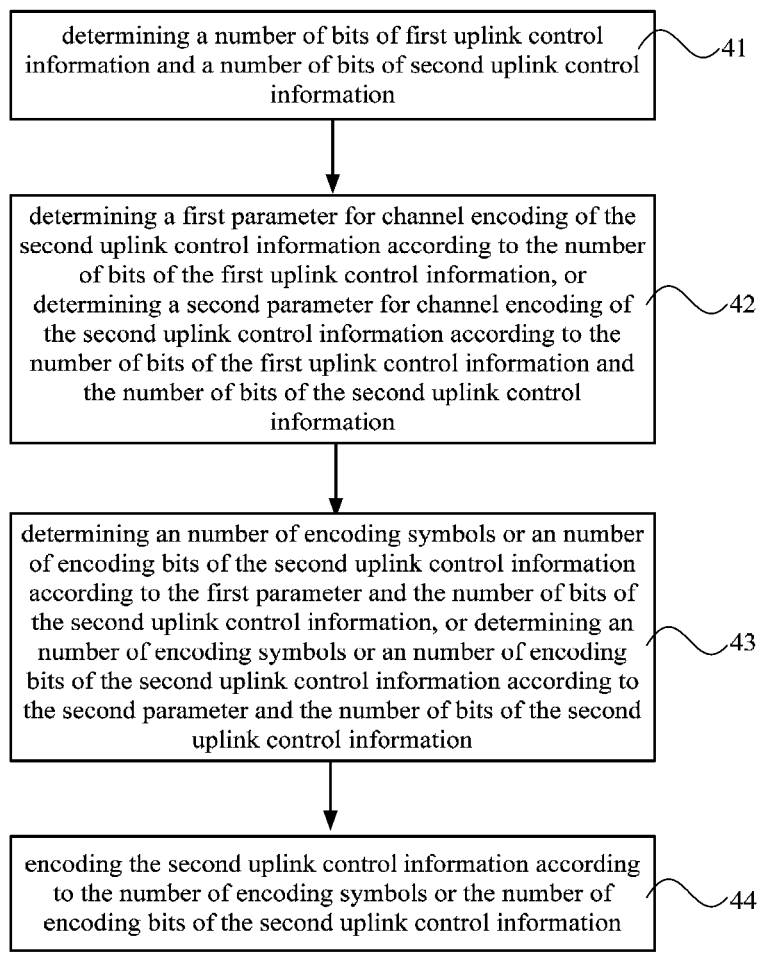
FIG. 4 is a flow chart of the method for encoding uplink control information according to another embodiment of the present disclosure.

Additionally, the process of determining the number of encoding symbols or the number of encoding bits $O'_{HARQ-ACK}$ of the HARQ-ACK/SR information by the third determining unit 83 is as shown in the method flow in FIG. 4. The process of determining the number of encoding symbols or the number of encoding bits $O'_{CSI}$ of the periodic CSI by the fourth determining unit 85 is as shown in the method flow in FIG. 4.

Figure 10:
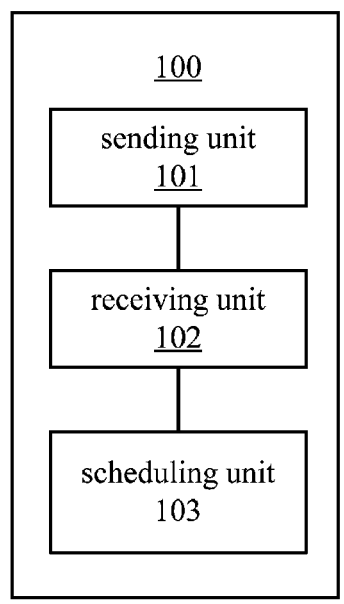
FIG. 10 is a structure schematic diagram of the apparatus for transmitting uplink control information on a physical uplink control channel according to yet another embodiment of the present disclosure.

In FIG. 10, the apparatus 100 for transmitting uplink control information on physical uplink control channel includes a sending unit 101, a receiving unit 102 and a scheduling module 103. Herein, the sending unit 101 is used for sending an indicator signaling such that user equipment UE determines a offset value of first uplink control information and second uplink control information for channel encoding according to the indicator signaling. The receiving unit is used for receiving the first uplink control information and the second uplink control information sent by the UE on the physical uplink control channel, wherein the first uplink control information and the second uplink control information are obtained according to the number of encoding symbols or the number of encoding bits of the first uplink control information as well as the number of encoding symbols or the number of encoding bits of the second uplink control information, the number of encoding symbols or the number of encoding bits of the first uplink control information as well as the number of encoding symbols or the number of encoding bits of the second uplink control information are determined according to the offset value as well as the first uplink control information and the second uplink control information. The scheduling module 103 is used for performing downlink data scheduling according to the first uplink control information and the second uplink control information.

Under the circumstance where the first uplink control information is the periodic CSI and the second uplink control information is the HARQ-ACK/SR information, the base station performs downlink data scheduling according to the periodic CSI and the HARQ-ACK/SR information.

The apparatus for transmitting uplink control information on a physical uplink control channel of the embodiment of the present disclosure can ensure that the total symbol number for encoding modulation of the periodic CSI and the HARQ-ACK/SR information does not exceed the number of encoding symbols which can be carried at most; the demodulating performances of the periodic CSI and the HARQ-ACK/SR information are at relatively approximate operating points, so as to achieve the best optimal performance; in different cases, for example, in the case of including channel and information number of bits, the channel encoding manners of the periodic CSI and the HARQ-ACK/SR information can be used universally.

A person skilled in the art will realize that the units and algorithm steps in respective examples of the embodiments disclosed herein can be implemented by electronic hardware or a combination of computer software and the electronic hardware. Whether those functions are performed by hardware or software depends on the specific application and the designed constraint condition of the technical solution. For each specific application, a person skilled in the art may implement the described functions in different methods, and the implementation shall not be regarded as going beyond the scope of the present disclosure.

A person skilled in the art will clearly understand that, in order for convenient and concise descriptions, the concrete working processes of the above system, device and units may refer to corresponding processes in the above method embodiments, which are not repeated herein.

To be noted, in the above embodiment of the base station, the included respective units are just classified according to the functional logics, but they are not limited thereto so long as corresponding functions can be implemented. In addition, the specific names of the respective units are also only used to distinguish the units from each other, rather than limiting the protection scope of the present disclosure.

In the embodiments provided by the present application, it shall be appreciated that the disclosed system, device and method may be implemented in other ways. For example, the above device embodiments are just exemplary. For example, the unit division is just a logical function division, and other division mode may be used in the implementation, e.g., multiple units or components may be combined or integrated into another system, or some features may be omitted or not executed. Another point is that the displayed or discussed mutual coupling, direct coupling or communication connection may be implemented through indirect coupling or communication connection between some interfaces, devices or units in electrical, mechanical or other forms.

The units described as separate parts may be or may not be physically separated, and the parts displayed as units may be or may not be physical units, i.e., they may be located at the same place or distributed to at least two network elements. The object of the solution of the embodiment may be achieved by selecting parts or all of units upon actual demand.

In addition, various functional units in the embodiments of the present disclosure may be integrated into one processing unit, or existed as individual physical units, or two or more units may be integrated into one unit.

When the functions are implemented in the form of software functional units and sold or used as individual products, they may be stored in a computer readable access medium. Based on such understanding, the technical solution of the present disclosure substantively, a part thereof making a contribution to the prior art, or a part of the technical solution, may be reflected in the form of software product which is stored in a storage medium, including several instructions to enable a computer device (e.g., personal computer, server, network facility, etc.) to execute all or a part of the steps of the methods of the respective embodiments. The storage medium includes various mediums capable of storing the program codes, such as U-disc, mobile hard disc, Read-Only Memory (ROM), Random Access Memory (RAM), magnetic disc, optical disc, etc.

The above descriptions are just preferred embodiments of the present disclosure, and the protection scope of the present disclosure is not limited thereto. Any change or substitution easily conceivable to a person skilled in the art within the technical scope disclosed by the present disclosure shall fall within the protection scope of the present disclosure. Therefore, the protection scope of the present disclosure shall be determined by the protection scope of the claims.

What is claimed is:

1. A method for encoding uplink control information, the method comprising:
   determining a number of bits of first uplink control information;
   determining a number of bits of second uplink control information;
   determining a parameter for channel encoding of the first uplink control information according to the number of bits of the first uplink control information and the number of bits of the second uplink control information;
   determining a number of encoding symbols or a number of encoding bits of the first uplink control information according to the parameter and the number of bits of the first uplink control information; and
   encoding the first uplink control information according to the number of encoding symbols or the number of encoding bits of the first uplink control information,
   wherein the first uplink control information comprises periodic channel state information (CSI),
   wherein the second uplink control information comprises a hybrid automatic repeat request acknowledgement and schedule request (HARQ-ACK/SR) information,
   wherein the HARQ-ACK/SR information comprises the hybrid automatic repeat request acknowledgement (HARQ-ACK) information, or the HARQ-ACK/SR information comprises the HARQ-ACK information and schedule request (SR) information, and wherein the determining the parameter for channel encoding of the first uplink control information according to the number of bits of the first uplink control information and the number of bits of the second uplink control information comprises:

according to the number of bits $O_{CSI}$ of the periodic CSI and the number of bits $O_{HARQ-ACK}$ of the HARQ-ACK/SR information, determining the parameter for channel encoding of the periodic CSI to be $\beta_{offset}^{CSI} - \alpha^{CSI} \cdot O_{CSI} - \alpha^{HARQ-ACT} \cdot O_{HARQ-ACK}$, wherein $\beta_{offset}^{CSI}$ is a first offset value of the periodic CSI, $\alpha^{CSI}$ is a coefficient of a second offset value of the periodic CSI, and $\alpha^{HARQ-ACK}$ is a coefficient of a third offset value of the HARQ-ACK/SR information.

2. The method according to claim 1, wherein the determining the number of encoding symbols or the number of encoding bits of the first uplink control information according to the parameter and the number of bits of the first uplink control information comprises:

according to the parameter and the number of bits $O_{CSI}$ of the periodic CSI, determining the number of encoding symbols or the number of encoding bits $O'_{CSI}$ of the periodic CSI being that:

$$O'_{CSI} = [O_{CSI}(\beta_{offset}^{CSI} - \alpha^{CSI} \cdot O_{CSI} - \alpha^{HARQ-ACK} \cdot O_{HARQ-ACK})].$$

3. The method according to claim 2, wherein after determining the number of encoding bits $O'_{HARQ-ACK}$ of the HARQ-ACK/SR information, further comprising:

determining a power adjusting value $h(n_{CSI}, n_{HARQ}, n_{SR})$ of the HARQ-ACK/SR information:

wherein when a UE is configured to perform transmission at two antenna ports by a high layer or when the UE transmits more than 11 bits, $$h(n_{CSI}, n_{HARQ}, n_{SR}) = \frac{n_{HARQ} + n_{SR} - 1}{3} + \frac{n_{CSI}}{r},$$

or $$h(n_{CSI}, n_{HARQ}, n_{SR}) = \frac{n_{HARQ} + n_{SR} - 1}{3} + \frac{10\log_{10}\left(\frac{48}{O'_{HARQ-ACK}}\right)}{r},$$

or $$h(n_{CSI}, n_{HARQ}, n_{SR}) = \frac{n_{HARQ} + n_{SR} - 1}{2} + \frac{n_{CSI}}{p},$$

or $$h(n_{CSI}, n_{HARQ}, n_{SR}) = \frac{n_{HARQ} + n_{SR} - 1}{2} + \frac{10\log_{10}\left(\frac{48}{O'_{HARQ-ACK}}\right)}{p};$$

wherein $n_{CSI}$ is the number of bits of the periodic CSI, $n_{HARQ}$ is the number of bits of the HARQ-ACK information, $n_{SR}$ is the number of bits of the SR information, r and p are equal to 3, 4, 5 or 6, $O'_{HARQ-ACK}$ is the number of encoding bits of the HARQ-ACK/SR information.

4. An apparatus for encoding uplink control information, the apparatus comprising:

a processor, configured to:

determine a number of bits of first uplink control information and a number of bits of second uplink control information;

determine a parameter for channel encoding of the first uplink control information according to the number of bits of the first uplink control information and the number of bits of the second uplink control information;

determine a number of encoding symbols or a number of encoding bits of the first uplink control information according to the parameter and the number of bits of the first uplink control information; and encode the first uplink control information according to the number of encoding symbols or the number of encoding bits of the first uplink control information, wherein the first uplink control information comprises a periodic channel state information (CSI), wherein the second uplink control information comprises a hybrid automatic repeat request acknowledgement and schedule request (HARQ-ACK/SR) information, wherein the HARQ-ACK/SR information comprises the hybrid automatic repeat request acknowledgement (HARQ-ACK) information, or the HARQ-ACK/SR information comprises the HARQ-ACK information and schedule request (SR) information, and wherein the processor is further configured to:

according to a number of bits $O_{CSI}$ of the periodic CSI and a number of bits $O_{HARQ-ACK}$ of the HARQ-ACK/SR information, determine the parameter for channel encoding of the periodic CSI to be $\beta_{offset}^{CSI} - \alpha^{CSI} \cdot O_{CSI} - \alpha^{HARQ-ACK} \cdot O_{HARQ-ACK}$, wherein $\beta_{offset}^{CSI}$ is a first offset value of the periodic CSI, $\alpha^{CSI}$ is a coefficient of a second offset value of the periodic CSI, and $\alpha^{HARQ-ACK}$ is a coefficient of a third offset value of the HARQ-ACK/SR information.

5. The apparatus according to claim 4, wherein the processor is further configured to:

determine a number of encoding symbols or a number of encoding bits $O'_{CSI}$ of the periodic CSI to be:

$$O'_{CSI} = [O_{CSI}(\beta_{offset}^{CSI} - \alpha^{CSI} \cdot O_{CSI} - \alpha^{HARQ-ACK} \cdot O_{HARQ-ACK})].$$

6. The apparatus according to claim 5, wherein the processor is further configured to:

after determining a number of encoding bits $O'_{HARQ-ACK}$ of the HARQ-ACK/SR information, determine a power adjusting value $h(n_{CSI}, n_{HARQ}, n_{SR})$ of the HARQ-ACK/SR information to be:

wherein when a UE is configured to perform transmission at two antenna ports by a high layer or when the UE transmits more than 11 bits, $$h(n_{CSI}, n_{HARQ}, n_{SR}) = \frac{n_{HARQ} + n_{SR} - 1}{3} + \frac{n_{CSI}}{r},$$

or $$h(n_{CSI}, n_{HARQ}, n_{SR}) = \frac{n_{HARQ} + n_{SR} - 1}{3} + \frac{10\log_{10}\left(\frac{48}{O'_{HARQ-ACK}}\right)}{r},$$

or $$h(n_{CSI}, n_{HARQ}, n_{SR}) = \frac{n_{HARQ} + n_{SR} - 1}{2} + \frac{n_{CSI}}{p},$$

or $$h(n_{CSI}, n_{HARQ}, n_{SR}) = \frac{n_{HARQ} + n_{SR} - 1}{2} + \frac{10\log_{10}\left(\frac{48}{O'_{HARQ-ACK}}\right)}{p};$$

wherein $n_{CSI}$ is the number of bits of the periodic CSI, $n_{HARQ}$ is the number of bits of the HARQ-ACK information, $n_{SR}$ is the number of bits of the SR information, r and p are equal to 3, 4, 5 or 6, $O'_{HARQ\text{-}ACK}$ is the number of encoding bits of the HARQ-ACK/SR information.

* * * * *